United States Patent [19]

Mizuguchi et al.

[11] 4,140,664

[45] Feb. 20, 1979

[54] THERMOSETTING RESIN COMPOSITION

[75] Inventors: Ryuzo Mizuguchi, Tondabayashi; Atushi Takahashi, Kyoto; Shin-ichi Ishikura, Takatsuki; Akimitsu Uenaka, Suita, all of Japan

[73] Assignee: Nippon Paint Co., Ltd., Japan

[21] Appl. No.: 830,792

[22] Filed: Sep. 6, 1977

[30] Foreign Application Priority Data

Sep. 3, 1976 [JP] Japan .................................. 51-105905

[51] Int. Cl.$^2$ ...................... C08L 33/02; C08L 35/00; C08L 61/24; C08L 61/28
[52] U.S. Cl. ................... 260/29.4 UA; 260/29.6 HN; 260/29.6 SQ; 260/29.6 TA; 260/29.7 T
[58] Field of Search ............. 260/29.4 UA, 29.6 HN, 260/29.6 SQ, 29.6 TA, 29.7 T; 526/265, 312

[56] References Cited

U.S. PATENT DOCUMENTS

| | | | |
|---|---|---|---|
| 3,759,982 | 9/1973 | Samour | 260/29.6 TA X |
| 3,780,092 | 12/1973 | Samour et al. | 260/29.6 SQ X |
| 3,926,888 | 12/1975 | Cheung et al. | 260/851 X |
| 3,937,679 | 2/1976 | Bosso et al. | 260/29.4 UA X |
| 3,953,643 | 4/1976 | Cheung et al. | 260/851 X |

*Primary Examiner*—Sandra M. Person
*Attorney, Agent, or Firm*—Wenderoth, Lind & Ponack

[57] ABSTRACT

An aqueous solution or dispersion of thermosetting resin comprising a resin, dissolved or dispersed in water in an amount of 5 to 85% by weight, said resin being obtained by solution polymerization of a mixture comprising (1) at least one polymerizable monomer having an amphoteric ion structure, (2) at least one polymerizable monomer containing a carboxyl group and (3) at least one of other polymerizable monomers in a hydrophilic organic solvent and has a number average molecular weight of 1,000 to 30,000 and a glass transition point of −30 to +80° C.

16 Claims, 2 Drawing Figures

FIG. 1

FIG. 2

THERMOSETTING RESIN COMPOSITION

The present invention relates to an aqueous solution or dispersion of thermosetting resin and a thermosetting paint composition containing the same. The thermosetting resin in the said aqueous solution or dispersion has an amphoteric ion structure. The said thermosetting paint composition is divided roughly into the following three kinds: firstly, an aqueous composition comprising the said aqueous solution or dispersion of thermosetting resin and an aminoplast resin; secondly, an aqueous composition comprising a resin emulsion having an amphoteric ion structure and an aminoplast resin; and thirdly, an aqueous composition comprising an aqueous resin liquid having an amphoteric ion structure, an aqueous resin liquid usually employed for paints and an aminoplast resin solution. These compositions can afford a coating film having an excellent appearance and a high quality under baking conditions of relatively low temperature and short time. Particularly the second and the third compositions show a high stability as a paint and a good workability in coating operation. The term "aqueous resin liquid" used in this invention is intended to mean "an aqueous solution or colloidal aqueous dispersion of resin" and/or "a resin emulsion".

Thermosetting paint compositions have been hitherto utilized in an extremely wide range in the field of industrial paints, because they are converted into a three dimentional polymeric substance by a chemical reaction, when heat energy is given after their application on a substrate to be painted, to afford a coating film having a high durability.

As such thermosetting paint compositions, there has been already developed, for example, an aqueous composition comprising an aqueous solution or colloidal aqueous dispersion of resin and an aminoplast resin solution. In this aqueous composition, however, it is required, for imparting a hydrophilic property to the water soluble resin or colloidal aqueous dispersion of resin, to introduce a larger amount of hydrophilic functional groups such as a COOH group and a OH group, compared with organic solvent type resins. These hydrophilic functional groups can not be eliminated effectively at the time of coating film formation thus causing various disadvantages such as deterioration in water resistance and solvent resistance of the formed coating film and appearance of delustering phenomenon at baking.

Lowering of the temperature required for thermal setting and shortening of the time for setting contribute greatly to economy in energy resources and besides enlarge the range of the kinds of substrates to be coated, woods, paper and plastics being thus included, in addition to metals. Since the greater part or all of the volatile component in an aqueous paint composition is usually water, it is possible to prevent air pollution and to avoid loss of oil resources.

In conventional aqueous thermosetting paint composition, however, the use of a resin having a large molecular weight in emulsion form can afford a high durability, but the appearance of the coating film is not good. By the use of a resin having a relatively low molecular weight in the form of aqueous solution or colloidal aqueous dispersion for the purpose of obtaining an excellent appearance of the coating film, to the contrary, the water resistance and solvent resistance of the coating film are deteriorated and the workability is insufficient, thick application being not possible and flowing out or hanging down being caused.

On the other hand, the aqueous paint composition is desired, form the above mentioned viewpoint, to contain as volatile component a large amount of water as much as possible. The composition is also required, at the same time, to not be inferior to conventional organic solvent type paints in workability in application and appearance and quality of the coating film. But, it is extremely difficult to satisfy these two requirements simultaneously. For obtaining all of the required properties, not taking account of the amount of the organic solvent to some extent, new controlling conditions which have never been thought of are necessitated in the baking temperature, the circumstances of operation of application and the process of application. For example, in an aqueous resin paint being excellent in coating film quality such as appearance, adhesion and water resistance, the amount of the organic solvent in the volatile component is required to be 50% by weight or more for obtaining a good workability. In this case, decrease of the amount of the organic solvent results in extreme reduction of the content of the solid component at the time of application, so that the workability of application is lowered, thick application being not possible or flowing out or hanging down being caused. An emulsion resin paint is advantageous in that a large amount of water is used and the solid content at the time of application can be increased. In this case, however, it is necessary for obtaining a good appearance of coating film to effect the baking at a relatively high temperature. In addition, there are problems to be solved in the coating film quality such as adhesion and water resistance, and the dispersion of pigments and its stability in duration of time.

Therefore, in practice, a paint being situated between water soluble resin paints and emulsion resin paints is employed, or these two kinds of paints are used in combination to compensate respective drawbacks each other. Even in the latter case, however, respective advantages of these paints are not exhibited sufficiently, and the two requirements as mentioned above can not be completely satisfied.

The first object of the present invention is to provide a novel aqueous solution or colloidal aqueous dispersion of thermosetting resin which can be advantageously used for the said aqueous composition and to provide further a thermosetting paint composition which can afford a coating film being excellent in water resistance and solvent resistance and having a smooth and lustrous surface, by combining the said aqueous solution or colloidal aqueous dispersion of thermosetting resin with an aminoplast resin, even when the said resin contains a large amount of hydrophilic functional groups. The second object of the invention is to provide an aqueous thermosetting paint composition which can afford a coating film being excellent in durability, water resistance and solvent resistance and having a good appearance at a relatively low temperature and in a short time with a good workability in application. The third object of the invention is to provide an aqueous thermosetting paint composition which shows a good workability in application and a high pigment dispersibility, in spite of the minimum amount of the organic solvent used, and can afford a coating film being excellent in durability, water resistance and solvent resistance and having a smooth and lustrous surface under baking conditions of relatively low temperature and short time.

As the result of the extensive study for attaining such objects, it has been found firstly that the said objective aqueous solution or colloidal aqueous dispersion of resin can be obtained by solution polymerization of a mixture of a specific polymerizable monomer having an ampho- teric ion structure and a carboxyl group-containing polymerizable monomer together with another polymerizable monomer, if necessary followed by neutralization treatment of the resultant polymeric product and dilution with water, and a paint composition obtained by blending the said aqueous solution or colloidal aqueous dispersion of resin with an aminoplast resin solution can afford a coating film having satisfying properties. It has also been found secondly that the said objective aqueous composition can be obtained by combining the said aqueous solution or colloidal aqueous dispersion of resin having an amphoteric ion structure with a resin emulsion and an aminoplast resin solution. It has been found thirdly that the said objective paint composition can be obtained by blending the resin source usually employed for aqueous paints with an aqueous resin liquid having an amphoteric ion structure and an aminoplast resin solution. The present invention is based on these findings.

According to the present invention, there are provided firstly an aqueous solution or colloidal aqueous dispersion of thermosetting resin comprising a resin, dissolved or dispersed in water in an amount of 5 to 85% by weight (as non-volatile component), which is obtained by solution polymerization of a mixture comprising (1) at least one polymerizable monomer with amphoteric ion structure selected from the group consisting of (i) compounds represented by formula:

wherein $R_1$ is a hydrogen atom or a methyl group, $R_2$ and $R_3$ are, the same or different, a $C_1$-$C_6$ alkyl group, A is O or NH, $m_1$ and $n_1$ are, the same or different, an integer of 1 to 12 and $X^\ominus$ is $SO_3^\ominus$, $SO_4^\ominus$ or $CO_2^\ominus$ and (ii) compounds represented by either one of the formulae:

wherein $R_4$ is a hydrogen atom or a methyl group, $R_5$ is a hydrogen atom or a $C_1$-$C_3$ alkyl group, $m_2$ is an integer of 0 to 6, $n_2$ is an integer of 1 to 5, and A and $X^\ominus$ are as defined above, (2) at least one polymerizable monomer containing a carboxyl group and (3) at least one of other polymerizable monomers in a hydrophilic organic solvent and has a number average molecular weight of 1,000 to 30,000 and a glass transition point of $-30°$ to $+80°$ C., and a thermosetting paint composition comprising the said aqueous solution or colloidal aqueous dispersion of thermosetting resin and an aminoplast resin solution. There are also provided secondly a thermosetting paint composition which comprises (a) a resin emulsion obtained by polymerizing an amphoionic polymerizable monomer and another polymerizable monomer being copolymerizable therewith, (b) an aqueous solution or colloidal aqueous dispersion of resin obtained by polymerizing an ampho-ionic polymerizable monomer and a carboxylic monomer as the essential components with another polymerizable monomer being copolymerizable therewith and (c) an aminoplast resin solution. There are also provided thirdly a thermosetting paint composition which comprises (a) an aqueous solution or colloidal aqueous dispersion of resin usually employed for paints and/or a resin emulsion usually employed for paints, (b) an aqueous solution or colloidal aqueous dispersion of resin with amphoteric ion structure and/or an emulsion of resin with amphoteric ion structure and (c) an aminoplast resin solution.

The three thermosetting paint compositions according to the invention will be hereinafter explained in detail.

First thermosetting paint composition

The ampho-ionic monomer (i) represented by the formula [I] is prepared by reacting an aminoalkyl ester of appropriate acrylic or methacrylic acid with sultone or lactone. It may be also prepared by the addition reaction of an acrylate or methacrylate of an appropriate aminoalkyl compound or an acrylamide or methacrylamide of an appropriate aminoalkyl compound with alkylene oxide and $SO_2$ or $SO_3$. Specific examples of the compound (i) are 3-dimethyl(methacryloylethyl)ammonium propanesulfonate, 3-diethyl(methacryloylethyl)ammonium propanesulfonate, 3-3-dimethyl(acryloylethyl)ammonium propanesulfonate, 3-diethyl(acryloylethyl)ammonium propanesulfonate, 3-dimethyl(methacryloylethyl)ammonium ethanecarboxylate, 3-diethyl(methacryloylethyl)ammonium ethanecarboxylate, 3-dimethyl(acryloylethyl)ammonium ethanecarboxylate, 3-diethyl(acryloylethyl)ammonium ethanecarboxylate, etc.

The compound (ii) represented by either one of the formulae [II] and [III] is prepared by the reaction of an appropriate vinyl pyridine derivative with sultone or lactone. Specific examples are 4-vinylpyridinium propanesulfonate, 2-vinylpyridinium propanesulfonate, 4-vinylpyridinium ethanecarboxylate, 2-vinylpyridinium ethanecarboxylate, etc. These ampho-ionic monomers (i) and (ii) may be employed solely or in combination. They may be subjected to the polymerization as such or in the form of an aqueous solution of suitable concentration.

As the carboxyl monomer, acrylic acid, methacrylic acid, crotonic acid, itaconic acid, maleic acid, fumaric acid, and their derivatives are exemplified. These compounds are used solely or in combination.

The other polymerizable monomer may be one containing an ethylenic double bond which is usually employed for polymerization. Specific examples are as follows:

(a) Hydroxyl group-containing polymerizable monomers: 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol, etc.

(b) Acrylates or methacrylates having a $C_1$-$C_{12}$ alcoholic residue: methyl acrylate, methyl methacrylate, n-butyl acrylate, etc.

(c) Polymerizable amides: acrylamide, methacrylamide, etc.

(d) Polymerizable nitriles: acrylonitrile, methacrylonitrile, etc.

(e) Polymerizable aromatic compounds: styrene, α-methylstyrene, vinyltoluene, t-butylstyrene, etc.

(f) α-Olefin compounds: ethylene, propylene, etc.

(g) Vinyl compounds: vinyl acetate, vinyl propionate, etc.

(h) Diene compounds: butadiene, isoprene, etc.

These compounds (a) to (h) may be used solely or in combination.

The aqueous solution or colloidal aqueous dispersion of thermosetting resin in the composition of the invention comprises a system in which a polymeric product obtained by solution polymerization of the said ampho-ionic monomer, the carboxylic monomer and another monomer in a hydrophilic organic solvent by a conventional radical polymerization procedure, if necessary followed by neutralization, is dissolved or dispersed in water. The proportion of amounts of these monomers to be used may be appropriately varied depending on the properties of the said aqueous solution or colloidal aqueous dispersion of resin (particularly stability and viscosity) and the uses. Usually, the following ranges of proportions are adopted: the ampho-ionic monomer, 0.1 to 50%; preferably 0.5 to 30% (by weight), to the total amount of the monomers; the carboxylic monomer, 2 to 60%, preferably 3 to 50%; the other polymerizable monomer, 1 to 97.9%, preferably 5 to 95%. When the amount of the ampho-ionic monomer is smaller than 0.1%, the quality of the coating film tends to be deteriorated. When it is larger than 50%, the improvement of the quality of the coating film is not expected, but the water resistance of the coating film is rather apt to be decreased. In case of the amount of the carboxylic monomer being smaller than 2%, the stability of the aqueous solution or colloidal aqueous dispersion of resin tends to become insufficient, and in case of its amount exceeding 60%, the water resistance and the chemical resistance of the coating film are often lowered.

The use of the ampho-ionic monomer is such a small amount as 0.5 to 10% is more advantageous in respect of the luster and the smoothness of the surface of the coating film, and besides the time required for dispersing at the preparation of the objective composition can be shortened.

As the polymerization initiator to be used in the said solution polymerization, a conventional one may be employed. Specific examples are peroxides such as benzoyl peroxide, di-t-butylperoxide and cumene hydroperoxide and azo compounds such as azobisisobutyronitrile, 2,2'-azobis(2,4-dimethylvaleronitrile and 4,4'-azobis-4-cyanovaleric acid. These initiators may be used solely or in combination, usually in an amount of 0.05 to 5%, preferably 0.1 to 4%, to the total amount of the monomers. In carrying out the polymerization reaction, all amount of the initiator to be used may be admixed with the polymerizable monomers, or a part or all of its amount may be incorporated in the hydrophilic organic solvent.

There may be also used a conventional chain transfer agent such as a mercaptan (e.g. laurylmercaptan, hexylmercaptan) in an appropriate amount. The chain transfer agent may be usually admixed with the said another polymerizable monomer.

As the hydrophilic organic solvent, there may be employed a conventional one such as a $C_1$-$C_6$ alcohol, a diol (e.g. ethylene glycol, butylene glycol), a ketone (e.g. acetone, methylethylketone, methylisobutylketone), an ether alcohol (e.g. ethylene glycol monoethyl ether, ethylene glycol monobutyl ether, 3-methyl-3-methoxybutanol). These solvents may be used solely or in combination.

The solution polymerization may be effected by a conventional radical polymerization procedure. For example, all of the monomers are admixed at a designed polymerization temperature (usually 40° to 250° C.) in the hydrophilic organic solvent in the presence of the polymerization initiator. Alternatively, the mixture of all of the monomers is dropwise added to the hydrophilic organic solvent previously kept at the polymerization temperature as mentioned above, and if necessary, the resultant reaction mixture is subjected to aging. The polymerization time is usually in the range of 0.5 to 20 hours.

The thus obtained polymerization product is usually neutralized with an appropriate basic substance and then dissolved or dispersed in water with an appropriate concentration to obtain the objective aqueous solution or colloidal aqueous dispersion of thermosetting resin, the said neutralization treatment being not necessarily required in case of the polymeric product containing 6% or more of the carboxyl monomer.

Examples of the said basic substance are ammonia, amines such as trimethylamine, diethylamine, triethylamine, tributylamine, diethanolamine, diemethylethanolamine, diethylethanolamine, 2-amino-2-methyl-1 propanol, morpholine and pyridine, and inorganic alkaline substances such as potassium hydroxide, sodium hydroxide, lithium hydroxide and calcium hydroxide. These compounds are used solely or in combination, in an amount of 0.1 to 2 mole equivalent to the total amount of the acid in the polymerization product.

The thus obtained aqueous solution or colloidal aqueous dispersion of thermosetting resin may be present in an optional form from a complete aqueous solution to a colloidal aqueous dispersion, depending on the content of the hydrophilic functional group in the resin compound (e.g. ampho-ionic group, carboxyl group, hydroxyl group) and especially the neutralization degree of carboxyl group and the content of the hydrophilic organic solvent. It is usually designed that the content of the non-volatile component, the value of $\overline{M}n$ and the value of Tg become 5–85%, 1,000–30,000 and −30°–+80° C., respectively. Such aqueous solution or colloidal aqueous dispersion of thermosetting resin may be subjected, solely or in combination, to the preparation of a paint composition as mentioned below.

The first thermosetting paint composition of the invention is composed of the said aqueous solution or colloidal aqueous dispersion of resin and an aminoplast resin solution.

As the aminoplast resin solution, there may be employed a conventional one such as a melamine resin solution, urea solution or a guanamine resin solution, solely or in combination. These resin solutions may be used as such or if necessary in the form of a dilution in water and/or an appropriate hydrophilic solvent (e.g. ethylene glycol monoalkyl ether, diethylene glycol monoalkylether). The amount of the aminoplast resin solution to be used is not particularly limited. Usually, it may be used in an amount of 5 to 100 parts (by weight), preferably 10 to 50 parts, as the resin component, to 100 parts of the resin component in the aqueous solution or colloidal aqueous dispersion of resin. When the amount is smaller than 5 parts, a sufficiently bridged coating film can not be formed, so that the water resistance and the solvent resistance are inferior. When it is larger than 100 parts, the coating film becomes too fragile, so that the composition is unsuitable for the use of coating.

The preparation of the thermosetting paint composition of the invention is effected by admixing the aqueous solution or colloidal aqueous dispersion of resin and the aminoplast resin solution or its dilution in a designed proportion at room temperature to make a dispersion, if necessary with optional addition of an organic or inorganic pigment for coloring, an extender pigment, an anti-corrosive pigment and other additives (e.g. filler, bulking agent, viscosity-increasing agent), a surface active agent, a pH-regulating agent, water and hydrophilic organic solvents in appropriate amounts. When the thus obtained composition is applied to a substrate to be coated by a conventional procedure to make a film thickness of 5 to 500μ and then subjected to baking and drying, a hardened coating film having a good surface appearance can be formed.

In the first thermosetting paint composition of the invention, the ampho-ionic group of the resin component of the aqueous solution or colloidal aqueous dispersion of resin reacts effectively with the aminoplast resin to cause bridging and besides accelerates the bridging reaction between the carboxyl groups or hydroxyl groups and the aminoplast resin. Therefore, the baking and drying can be effected under mild conditions at a temperature of 70° to 200° C. for 30 seconds to 60 minutes, hardening conditions of high temperature and long time adopted for conventional compositions being not necessitated, and an excellent coating film having a smooth surface and showing high water resistance and solvent resistance can be obtained.

Second thermosetting paint composition.

The resin emulsion (a) in the present composition comprises a system obtained by polymerization of one or more of the ampho-ionic monomers (i) and (ii), if necessary in the form of an aqueous solution, and the another polymerizable monomer being copolymerizable therewith in water by a conventional procedure for radical polymerization or redox polymerization.

The said another polymerizable monomer may be a conventional one containing an ethylenic double bond. Specific examples are as follows:

(a) Carboxylic monomers: acrylic acid, methacrylic acid, crotonic acid, itaconic acid, maleic acid, fumaric acid, and their derivatives.

(b) Hydroxyl-group-containing monomers: 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol, etc.

(c) Monomers other than (a) and (b): acrylates or methacrylates having a $C_1$–$C_{12}$ alcoholic residue (e.g. methyl acrylate, methyl methacrylate, n-butyl acrylate), polymerizable amides (e.g. acrylamide, methacrylamide), polymerizable nitriles (e.g. acrylonitrile, methacrylonitrile), polymerizable aromatic compounds (e.g. styrene, α-methylstyrene, vinyltoluene, t-butylstyrene), α-olefin compounds (e.g. ethylene, propylene), vinyl compounds (e.g. vinyl acetate, vinyl propionate), diene compounds (e.g. butadiene, isoprene), etc. These polymerizable monomers (a) to (c) may be used solely or in combination.

The proportion of the amounts of the ampho-ionic monomer and the another polymerizable monomer to be used may be appropriately varied depending on the thermal hardening property of the objective composition and the quality of the coating film. Usually, the amount of the ampho-ionic monomer is in the range of 0.1 to 50%, preferably 0.5 to 30%, to the total amount of the monomers. The amount of the another polymerizable monomer is in the range of 50 to 99.9%, preferably 70 to 99.5%. When the amount of the ampho-ionic monomer is smaller than 0.1%, the thermal hardening property of the objective composition tends to be deteriorated. When it exceeds 50%, further improvement of the thermal hardening property is not expected, but the water resistance of the coating film is apt to be lowered. In case of using the carboxylic monomer or the hydroxyl group-containing monomer as the another polymerizable monomer, their respective amount is desired to be 30% or less to the total amount of the monomers. With an amount larger than 30%, the water resistance and the chemical resistance of the coating film are often decreased.

As the polymerization initiator to be used in the polymerization reaction for preparation of the resin emulsion, there may be employed a conventional one such as a water-soluble azo compound (e.g. azobiscyanovaleric acid, azobis-(2-amidinopropane)hydrochloride), a water-soluble radical initiator (e.g. potassium persulfate, ammonium persulfate, sodium persulfate, hydrogen persulfate) or a redox initiator obtained by combining a water-soluble radical initiator with sodium pyrrosulfite, sodium hydrogensulfite, ferric ion or the like. These initiators may be used solely or in combination. In case of necessity, an oil-soluble organic peroxide such as benzoyl peroxide, t-butyl peroxide or cumenehydroperoxide, or an oil-soluble azo compound such as azobisisobutyronitrile may be employed together with the polymerization initiator. The amount of the polymerization initiator to be used is usually in the range of 0.05 to 5%, preferably 0.1 to 3%, to the total amount of the monomers. There may be also employed a conventional chain transfer agent such as a mercaptan (e.g. laurylmercaptan, hexylmercaptan) in an appropriate amount.

In the polymerization reaction for preparation of the resin emulsion, the ampho-ionic monomer serves as an emulsifier or a dispersing agent, so that the use of such an agent is unnecessary unlike the case of emulsion polymerization. Usually, the polymerization reaction of the ampho-ionic monomer and the another polymerizable monomer is effected in water as the reaction medium (if necessary admixed with a hydrophilic organic solvent) at a designed reaction temperature (usually at 4° to 100° C.) in the presence of the polymerization initiator in an inert gas atmosphere under normal or elevated pressure. In carrying out the polymerization, water containing the polymerization initiator is kept at the reaction temperature, the ampho-ionic monomer or its aqueous solution and the another monomer are dropwise added thereto separately in 5 to 300 minutes at the same time, and the resultant mixture is aged at the same temperature for 5 minutes to 10 hours to obtain a milky or creamy resin emulsion containing 5 to 70% of non-volatile component, which is preferably used at a pH of 7 or larger.

The aqueous solution or colloidal aqueous dispersion of resin (b) in the present composition comprises a system obtained by solution polymerization of the ampho-ionic monomer, the carboxylic monomer and the another polymerizable monomer being copolymerizable therewith in a hydrophilic organic solvent by a conventional procedure for radical polymerization and subsequent dissolution or dispersion of the polymeric product in water, if necessary after neutralization.

The aqueous solution or colloidal aqueous dispersion of resin is composed of the ampho-ionic monomer and the carboxylic monomer as the essential component together with another polymerizable monomer as used in the resin emulsion mentioned above (excluding the carboxylic monomer). The proportion of the amounts of these monomers may be appropriately varied depending on the stability, the dispersibility and the thermal hardening property of the objective composition and the quality of the coating film. In usual, the following ranges of proportion may be adopted: the ampho-ionic monomer, 0.1 to 50%, preferably 0.5 to 30%, to the total amount of the monomers; the carboxylic monomer, 1 to 40%, preferably 2 to 30%; the another polymerizable monomer, 10 to 98.9%, preferably 40 to 97.5%. When the amount of the ampho-ionic monomer is smaller than 0.1%, the quality of the coating film tends to be deteriorated. When it is larger than 50%, further improvement of the quality of the coating film is not expected, but the water resistance of the coating film is apt to be lowered. In case of the amount of the carboxylic monomer being smaller than 1%, the stability of the aqueous solution or colloidal aqueous dispersion of resin tends to become insufficient, and in case of its amount exceeding 40%, the water resistance of the coating film is often lowered. The use of the ampho-ionic monomer in such a small amount as 0.5 to 10% is more advantageous in respect of the luster and the smoothness of the surface of the coating film, and besides the time required for dispersing at the preparation of the objective composition can be shortened.

As to the kind and the amount of the polymerization initiator to be used in the solution polymerization, the kind of the chain transfer agent to be optionally employed, the kind of the hydrophilic organic solvent, the conditions and procedures for the polymerization and the kind and the amount of the basic substance to be used for neutralization after the solution polymerization, the same selection and determination may be effected as in the above mentioned aqueous solution or colloidal aqueous dispersion of resin in the said first thermosetting paint composition. The product thus obtained by solution polymerization is, if necessary after neutralization treatment, dissolved in water to make an appropriate concentration so as to obtain the objective aqueous solution or colloidal aqueous dispersion of resin. It is usually designed that the aqueous solution or colloidal aqueous dispersion of resin has a content of the non-volatile component of 5 to 85%, a value of $\overline{Mn}$ of 1,000 to 30,000 and a value of Tg of −30° to +80° C.

As the aminoplast resin solution (c) in the present composition, the same one as used in the above mentioned first thermosetting paint composition may be employed.

In the preparation of the second thermosetting paint composition of the invention, it is not required to use only one kind of each of the resin emulsion (a) and the aqueous solution or colloidal aqueous dispersion of resin (b), but two or more kinds of them may be employed respectively. The proportion of the amounts of these substances to be used is as follows: the resin emulsion, 50 to 99%, preferably 60 to 98%, as the resin component; the aqueous solution or colloidal aqueous dispersion of resin, 1 to 50%, preferably 2 to 40%. When the amount of the resin emulsion is smaller than 50%, the workability in coating and the durability and the water resistance of the coating film tend to be reduced. When it is larger than 99%, the pigment dispersibility of the objective composition and the smoothness and the solvent resistance of the coating film are often lowered. The amount of the aminoplast resin solution (c) to be added to these aqueous resin liquids is not particularly limited. Usually, it is used in an amounts of 5 to 100 parts, preferably 10 to 50 parts, as the resin component to 100 parts of the total resin component of the resin emulsion and the aqueous solution or colloidal aqueous dispersion of resin. When the amount is smaller than 5 parts, a sufficiently bridged coating film can not be formed, so that the water resistance and the solvent resistance are inferior. When the amount exceeds 100 parts, the coating film tends to be too fragile, so that the composition becomes unsuitable for the use of coating.

The preparation of the objective thermosetting paint composition is effected by admixing the resin emulsion, the aqueous solution or colloidal aqueous dispersion of resin and the aminoplast resin solution in a designed proportion at room temperature to make a dispersion, if necessary with optional addition of a conventional organic or inorganic pigment for coloring, an extender pigment, an anti-corrosive pigment, and other additives (e.g. filler, bulking agent, viscosity-increasing agent), a surface active agent, a pH-regulating agent, water, and a hydrophilic organic solvent in appropriate amounts. Alternatively, the aqueous solution or colloidal aqueous dispersion of resin is admixed with pigments to make a pigment paste, to which the resin emulsion, the aqueous solution or colloidal aqueous dispersion of resin, the aminoplast resin solution and other additives are added to obtain the objective composition.

The thus obtained composition can afford a hardened coating film having a good surface appearance, when applied to a substrate to be coated by a conventional procedure to make a thickness of 5 to 500μ and then subjected to baking and drying.

In the second thermosetting paint composition, a high workability in coating can be attained especially by the excellent pigment dispersibility and defoaming property owing to the ampho-ionic group of the resin component in the aqueous solution or colloidal aqueous dispersion of resin. In addition, the ampho-ionic groups in the resin components of the two aqueous resin liquids react effectively with the aminoplast resin to cause bridging and besides accelerates the bridging reaction between the carboxyl groups (and if necessary, hydroxyl groups) and the aminoplast resin. Therefore, the baking and drying can be effected under mild conditions at a temperature of 70° to 250° C. for 10 seconds to 60 minutes, hardening conditions of high temperature and long time adopted for conventional compositions being not necessitated, and an excellent coating film having a smooth surface and showing high durability, water resistance and solvent resistance can be obtained.

Third thermosetting paint composition

The aqueous solution or colloidal aqueous dispersion of resin conventionally used for paints to be used as the component A of the preset composition may be any one which can react with the aminoplast resin to cause bridging. For example, an alkyd resin, an amino resin, a phenol resin or an acryl resin may be employed. As the usual resin emulsion for paints to be used in place of or in addition to the aqueous solution or colloidal aqueous dispersion of resin, there may be exemplified a vinyl acetate resin emulsion, a styrene-butadiene resin emulsion, an acryl resin emulsion, a vinyl chloride-vinylidene chloride resin emulsion and a butadiene-acrylonitrile resin emulsion. These substances as the component A may be used solely or in combination.

The component B of the present composition, i.e. the aqueous solution or colloidal aqueous dispersion of resin having an ampho-ionic structure (hereinafter referred to as "Component $B_1$") and the resin emulsion having an ampho-ionic structure to be used in place of or in addition to the above aqueous solution or colloidal aqueous dispersion of resin (hereinafter referred to as "Component $B_2$") may be respectively the same as in the second thermosetting paint composition mentioned above. Each of these components $B_1$ and $B_2$ may be used solely or in combination of two or more kinds.

The aminoplast resin solution as the component C of the present composition may be the same as in the first thermosetting paint composition mentioned above.

The proportion of the amounts of the components A and B is as follows: the component A, 10 to 95%, preferably 20 to 90%, as the resin component; the component B, 5 to 90%, preferably 10 to 80%. When the amount of the component B is smaller than 5%, the characteristic feature of the ampho-ion in the component B is not exhibited sufficiently and the pigment dispersibility and the workability of the objective composition and the water resistance of the coating film are inferior. The use of the component B in an amount exceeding 90% tends to reduce the brightness of the coating formed with the so-called wet on wet metallic paint, the water resistant adhesiveness to an iron substrate and in some cases the solvent resistance. The amount of the component C to be added to these two components is not particularly limited. Usually, it is used in an amount of 5 to 50% as the resin component to the total amount of the resin components of the components A to C. When the amount is smaller than 5%, a sufficiently bridged coating film can not be formed, so that the hardness, the solvent resistance and the water resistance of the coating film are inferior. When it exceeds 50%, the formed coating film becomes too fragile, or the water resistance is lowered, so that the composition is unsuitable for the use of coating.

The preparation of the present third thermosetting paint composition is effected by admixing the components A to C in a designed proportion at room temperature to make a dispersion, if necessary with optional addition of a conventional organic or inorganic pigment for coloring, an extender pigment, an anti-corrosive pigment and other additives (e.g. filler, bulking agent, viscosity-increasing agent), a surface active agent, a pH-regulating agent, water and a hydrophilic organic solvent in appropriate amounts. It is desirable to use as the dispersion medium for pigments the aqueous solution or colloidal aqueous dispersion of resin, especially the component $B_1$.

The thus prepared composition can afford a hardened coating film having a good surface appearance, when applied to a substrate to be coated to make a thickness of 5 to 100μ by a conventional procedure and then subjected to baking and drying.

Since the third thermosetting paint composition contains a resin component having an ampho-ionic structure, it shows superiority in the pigment dispersibility, the workability in coating, the baking conditions, and the quality of the coating film. This is explained by the following reasons:

(1) When the component $B_1$ having an ampho-ionic structure is used in dispersing pigments as mentioned above, operations of pigment-dispersing are made facile because of the high pigment-dispersibility and defoaming property owing to the ampho-ionic group, and besides the produced paint composition has excellent coagulation-stability and color-distinction.

(2) By incorporating the component B, a low viscosity and a high content of non-volatile components of the paint composition are maintained even when the amount of water in the volatile component exceeds 60%, and a good workability in coating can be obtained.

(3) Since the ampho-ionic group of the component B reacts effectively with the aminoplast resin to cause bridging and besides accelerates the bridging reaction between the carboxyl group or the hydroxyl group occasionally present in the system and the aminoplast resin, the baking for hardening the coating film can be effected under milder conditions of lower temperature and shorter time in comparison with the conventional aqueous paints, and the amount of excess carboxyl groups and hydroxyl groups remaining in the effective net structure of the coating film becomes smaller, compared with the conventional aqueous paints, so that excellent durability, water resistance and oil resistance can be obtained.

The present invention will be hereinafter explained further in detail by the following Reference Examples, Examples of Invention and Comparative Examples, wherein parts and % are by weight. Reference Examples Nos. 1 and 2 illustrate the preparation of the ampho-ionic monomer. Reference Examples Nos. 3 to 12 illustrate the preparation of the resin emulsion having an ampho-ionic structure. Reference Examples Nos. 13 to 23 illustrate the preparation of the aqueous solution or colloidal aqueous dispersion of resin having an ampho-ionic structure. Example No. 21 includes an example for comparison.

Reference Example 1

In a 2 liter volume separable flask equipped with a stirrer, a cooler and a thermometer, N,N-dimethylaminoethyl methacrylate (350 g) and acetone (800 g) are charged, and while stirring at 30° C., a mixture of 1,3-propane sultone (272 g) and acetone (100 g) is dropwise added thereto in 30 minutes. After completion of the addition, stirring is continued for further 4 hours at the same temperature. Then, the reaction mixture is allowed to stand at room temperature for 24 hours. The precipitated white crystals are collected by filtration, washed with acetone and dried under reduced pressure to obtain 3-dimethyl(methacryloylethyl)ammonium propanesulfonate (591 g). Yield, 96%. M.P. 149° C. The chemical structure of the thus produced compound, hereinafter referred to as "Compound A", is as follows:

Reference Example 2

In the same flask as in Reference Example 1, N,N-dimethylaminoethyl methacrylate (628 g) and ethyl methyl ketone (400 g) are charged, and while stirring at 0° C., a mixture of β-propiolactone (288 g) and ethyl methyl ketone (300 g) is dropwise added thereto in 1 hour. After completion of the addition, stirring is continued for further 4 hours at the same temperature. Then, the reaction mixture is allowed to stand in a refrigerator for 24 hours. The precipitated white crystals are collected by filtration, washed with ethyl methyl ketone and dried under reduced pressure to obtain 3-dimethyl(methacryloylethyl)ammonium ethanecarboxylate (756 g). Yield, 83%. M.P. 102° C. The chemical structure of the thus produced compound, hereinafter referred to as "Compound B", is as follows:

EXAMPLE 1

In a 2 liter volume reaction vessel equipped with a stirrer, a cooler and a temperature-controlling device, ethylene glycol monoethyl ether (58 parts) is charged, and while stirring at 120° C., a mixture comprising styrene (94 parts), methyl methacrylate (94 parts), n-butyl acrylate (124 parts), acrylic acid (40 parts), 2-hydroxyethyl acrylate (40 parts), Compound A obtained in Reference Example 1 (8 parts), azobisisobutyronitrile (6 parts) and laurylmercaptan (8 parts) is dropwise added thereto in 2 hours. Then, a mixture comprising azobisisobutyronitrile (2 parts) and ethyl methyl ketone (12 parts) is dropwise added in 30 minutes at the same temperature, and stirring is continued for further 1 hour. The resultant viscous polymeric product is neutralized with dimethylaminoethanol (50 parts) and diluted with deionized water (680 parts) to obtain a yellow aqueous solution of thermosetting resin. Content of non-volatile component, 33.1%. Viscosity, 285,000 cps (at 30° C.). $\overline{Mn}$ (determined by gel permeation chromatography), 6,000. Tg (determined by differential thermal analysis), 24° C.

EXAMPLE 2

The preparation of an aqueous resin solution is effected by the procedure as in Example 1 comprising solution polymerization, neutralizing treatment and dilution with water but using ethylene glycol monoethyl ether (388 parts), a mixture consisting of styrene (95 parts), methyl methacrylate (95 parts), n-butyl acrylate (126 parts), acrylic acid (40 parts), 2-hydroxyethyl acrylate (40 parts), Compound A obtained in Reference Example 1 (4 parts), azobisisobutyronitrile (6 parts) and laurylmercaptan(8 parts), dimethylaminoethanol (49.4 parts) as the neutralizing agent and deionized water (412 parts) for dilution to obtain a yellow aqueous solution of thermosetting resin. Content of non-volatile component, 32.9%. Viscosity, 180 cps (at 30° C.). $\overline{Mn}$, 4,500. Tg. 23° C.

EXAMPLES 3 to 14

The procedure as in Example 1 comprising solution polymerization, neutralization treatment and dilution with water is repeated but using a mixture having a varied composition as shown in Table 1 and dimethylaminoethanol as the neutralizing agent and deionized water for dilution in amounts as shown in Table 1 to obtain various aqueous solutions or dispersions of thermosetting resin (Nos. 3 to 14). The properties of the thus obtained aqueous resin solutions or dispersions are shown in Table 1.

Table 1

| Run No. | A | B | St | MMA | n-BA | AA | 2HEA | AIBN | LM | DMAE | Deionized water | Non-volatile component (%) | Viscosity (cps) (30° C) | $\overline{Mn}$ | Tg (° C) | Solubility |
|---|---|---|---|---|---|---|---|---|---|---|---|---|---|---|---|---|
| 3 | 4 | — | 101 | 101 | 134 | 20 | 40 | 6 | 4 | 12.4 | 745 | 33.2 | 66 | 10000 | 19 | C |
| 4 | 4 | — | 95 | 95 | 126 | 40 | 40 | 6 | 8 | 24.8 | 732 | 34.1 | 190 | 6000 | 23 | C |
| 5 | 4 | — | 95 | 95 | 126 | 40 | 40 | 6 | 8 | 34.7 | 722 | 33.9 | 130000 | 6000 | 23 | S |
| 6 | 4 | — | 95 | 95 | 126 | 40 | 40 | 6 | 8 | 49.6 | 707 | 34.2 | 865000 | 6000 | 23 | S |
| 7 | 4 | — | 89 | 89 | 118 | 60 | 40 | 6 | — | 52 | 705 | 34.5 | 260000 | 27000 | 26 | S |
| 8 | 8 | — | 100 | 100 | 132 | 20 | 40 | 6 | 8 | 12.4 | 745 | 33.4 | 365 | 5500 | 20 | C |
| 9 | 8 | — | 100 | 100 | 132 | 20 | 40 | 6 | 8 | 24.8 | 732 | 33.5 | 1250000 | 5500 | 20 | S |
| 10 | 8 | — | 94 | 94 | 124 | 40 | 40 | 6 | 12 | 24.8 | 732 | 33.8 | 260 | 2500 | 24 | C |
| 11 | 8 | — | 88 | 88 | 116 | 60 | 40 | 6 | 8 | 56 | 701 | 34.0 | 80000 | 6000 | 27 | S |
| 12 | — | 8 | 94 | 94 | 124 | 40 | 40 | 6 | 8 | 34.7 | 722 | 33.6 | 70000 | 5000 | 22 | S |
| 13 | 16 | — | 91 | 91 | 122 | 40 | 40 | 6 | 8 | 34.7 | 722 | 33.3 | 110000 | 6000 | 25 | S |
| 14 | 16 | — | 85 | 85 | 114 | 60 | 40 | 6 | 8 | 37.2 | 720 | 34.1 | 215000 | 5500 | 28 | S |

Note:
A = Compound A obtained in Reference Example 1; B = Compound B obtained in Reference Example 2; St = styrene; MMA = methyl methacrylate; n-BA = n-butyl acrylate; AA = acrylic acid; 2HEA = 2-hydroxyethyl acrylate; AIBN = azobisisobutyronitrile; LM = laurylmercaptan; DMAE = dimethylaminoethanol. The symbol C in the solubility of the properties means a property of dispersing in water in colloidal form. The symbol S means a water-solubility.

EXAMPLE 15

To a resin solution comprising a melamine resin ("Sumimal M-50W" manufactured by Sumitomo Chemical Company, Limited) (12.5 parts) dissolved in ethylene glycol monobutyl ether (12.5 parts), the aqueous solution of thermosetting resin obtained in Example 1 (90 parts) in portionwise added while stirring by a labomixer to prepare a thermosetting paint composition.

The thus obtained paint composition is applied to a tin plate to make a dry film thickness of 30μ and then baked at 120° C. or 140° C. for 20 minutes for drying, whereby a transparent coating film having a smooth surface is obtained. When the thus obtained coating film is immersed into boiling water at 100° C. for 1 hour, the dissolution degree and the swelling degree are 10.9% and 93.2%, respectively, at a baking temperature of 120° C., and 5.6% and 19.0%, respectively at a baking temperature of 140° C. When the coating film is immersed into a thinner widely used for paints for 1 hour, the dissolution degree is 1.7% at a baking temperature of 120° C. and 1.2% at a baking temperature of 140° C.

The dissolution degree and the swelling degree are calculated according to the following equations:

$$\text{Dissolution degree} = \frac{B - D}{B - A} \times 100$$

$$\text{Swelling degree} = \frac{C - D}{D - A} \times 100$$

wherein A is the weight of the tin plate, B is the total weight of the tin plate and the coating film, C is the total weight of the tin plate and the coating film immediately after the immersion and D is the total weight of the tin plate and the coating film after the immersion and the subsequent baking at 120° C. for 20 minutes.

EXAMPLE 16

Using the aqueous solution of thermosetting resin obtained in Example 5, the preparation of a paint composition and the formation of a baked coating film are effected in the same manner as in Example 15. The dissolution degree and the swelling degree of the thus obtained film after immersion into boiling water are 9.4% and 53.9%, respectively, at a baking temperature of 120° C., and 4.6% and 9.6%, respectively, at a baking temperature of 140° C. The dissolution degree after immersion into a thinner is 1.3% at a baking temperature of 120° C. and 0% at a baking temperature of 140° C.

EXAMPLE 17

Using the colloidal aqueous dispersion of thermosetting resin obtained in Example 8, the preparation of a paint composition and the formation of a baked coating film are effected in the same manner as in Example 15. The dissolution degree and the swelling degree of the thus obtained coating film after immersion into boiling water are 10.4% and 65.4%, respectively, at a baking temperature of 120° C., and 4.0% and 8.8%, respectively, at a baking temperature of 140° C. The dissolution degree after immersion into a thinner is 1.1% at a baking temperature of 120° C. and 0.7% at a baking temperature of 140° C.

Comparative Example 1

The preparation of an aqueous resin solution is effected by the procedure as in Example 1 comprising solution polymerization, neutralizing treatment and dilution with water but using a liquid mixture comprising styrene (96 parts), methyl methacrylate (96 parts), n-butyl acrylate (128 parts), acrylic acid (40 parts), 2-hydroxyethyl acrylate (40 parts), azobisisobutyronitrile (6 parts) and dodecylmercaptan (8 parts) to obtain a yellow aqueous solution of thermosetting resin having a content of non-volatile component of 33.4%.

Using the thus obtained aqueous solution of resin, the preparation of a paint composition and the formation of a baked coating film are effected in the same manner as in Example 15. The dissolution degree and the swelling degree of the thus obtained transparent coating film after immersion into boiling water are 23.0% and 345.1%, respectively, at a baking temperature of 120° C., and 8.3% and 98.7%, respectively, at a baking temperature of 140° C. The dissolution degree after immersion into a thinner is 2.2% at a baking temperature of 120° C. and 0.5% at a baking temperature of 140° C.

EXAMPLE 18

The aqueous solution of thermosetting resin obtained in Example 5 (60 parts) is admixed with white pigment ("Titon R-5N"; rutile type titanium oxide manufactured by Sakai Chemical Industry Co., Ltd.) (200 parts), ethylene glycol monobutyl ether (20 parts) and deionized water (46 parts), and the mixture is dispersed well by the aid of a SG mill for 15 minutes to prepare a white paint paste.

To the thus obtained paint paste (31.6 parts), the aqueous solution or dispersion of thermosetting resin obtained in Example 3, 4 or 5 (75 parts) and a melamine resin (20 parts) are added and mixed well in the same manner as in Example 15 to obtain a white thermosetting paint composition.

The obtained paint composition is applied to a steel palte subjected to a previous treatment to make a dry film thickness of about 40μ and then baked at 140° C. for 30 minutes for drying to obtain a hardened coating film whose properties are shown in Table 2.

Table 2

| Pro-<br>perties | Aqueous liquid of thermosetting resin | Example No. | | |
|---|---|---|---|---|
| | | 3 | 4 | 5 |
| Surface of coating film | | Smooth and good | Smooth and good | Smooth and good |
| Luster (determined by a gloss-meter with an angle of 60°) | | 88 | 94 | 93 |
| Pencil hardness | | 2H | 2H | 2H |
| Erichsen value (mm) | | 1.3 | 1.7 | 1.7 |
| Impact strength (DuPont method, ½ kg, ½ inch) (cm) | | 20 | 25 | 25 |
| Water resistance (40° C × 500 hours) | | Normal | Normal | Normal |
| Gasoline resistance (after immersion into commercially available gasoline for 20 minutes) | | Normal | Normal | Normal |

Reference Example 3

In a 2 liter volume reaction vessel equipped with a stirrer, a cooler, a temperature-controlling apparatus and a nitrogen gas-introducing tube, deionized water (300 parts) is charged, and while stirring at 80° C. in the nitrogen atmosphere, potassium persulfate (4.5 parts) and sodium hydrogensulfite (1.5 parts) are added thereto. Then, the first liquid mixture comprising the compound A obtained in Reference Example 1 (25 parts), methacrylic acid (25 parts) and deionized water (150 parts) and the second liquid mixture comprising methyl methacrylate (133 parts), styrene (133 parts), n-butyl acrylate (133 parts) and 2-hydroxyethyl methacrylate (50 parts) are dropwise added, separately and simultaneously, at the same temperature in 12 minutes. After the addition, a solution comprising potassium persulfate (1.5 parts), sodium hydrogensulfite (0.5 parts) and deionized water (50 parts) is added thereto at the same temperature, and stirring is continued for further 30 minutes, whereby a resin emulsion containing 50.2% of non-volatile component and showing a pH value of 1.9 and a viscosity of 96 cps (30° C.) is obtained. This solution is subjected to subsequent use after adjustment of the pH value to 7.5 with dimethylethanolamine. (In the resin emulsions of the following Reference Examples Nos. 4 to 12, this pH adjustment is also effected.)

Reference Example 4

In a 2 liter volume reaction vessel equipped with a stirrer, a cooler and a temperature-controlling apparatus, deionized water (288 parts) is charged, and while stirring at 90° C., a solution of polymerization initiator comprising azobiscyanovaleric acid (8 parts), dimethylethanolamine (5.6 parts) and deionized water (80 parts) is added thereto in a ¼ amount. Then, the first liquid mixture comprising the compound A obtained in Reference Example 1 (8 parts), 2-hydroxyethyl acrylate (8 parts) and deionized water (120 parts), the second liquid mixture comprising styrene (105.6 parts), methyl methacrylate (105.6 parts), n-butyl acrylate (140.8 parts) and 2-hydroxyethyl acrylate (32 parts) and the rest of the above mentioned solution of polymerization initiator are dropwise added, separately and simultaneously, at the same temperature in 20 minutes. After the addition, stirring is continued for further 40 minutes to obtain a thermosetting resin emulsion containing 44.7% of non-volatile component. Viscosity, 103 cps (30° C.). Particle size of resin, 0.283μ.

Reference Examples 5 to 11

The preparation of the resin emulsion is effected in the same manner as in Reference Example 4 but using the first liquid mixture, the second liquid mixture and the solution of polymerization initiator each having a varied composition (parts) shown in Table 3 to obtain various thermosetting resin emulsion (Nos. 5 to 11), whose properties are shown in Table 3.

pound A obtained in Reference Example 1 (8 parts), azobisisobutyronitrile (6 parts) and lauryl mercaptan (8 parts) is dropwise added in 2 hours. Then, a solution comprising azobisisobutyronitrile (2 parts) and ethyl methyl ketone (12 parts) is dropwise added in 30 minutes, and stirring is continued for further 1 hour. The resultant viscous liquid resin is neutralized with dimethylaminoethanol (50 parts) and diluted with deionized water (680 parts) to obtain a yellow aqueous solution of resin containing 33.1% of nonvolatile component. Viscosity, 285,000 cps (30° C.). $\overline{M}n$, 6,000. Tg, 24° C.

Reference Example 14

The preparation of aqueous resin solution is effected by the solution polymerization, the neutralizing treatment and the dilution with water in the same manner as in Reference Example 13 but employing ethylene glycol monoethyl ether (388 parts), a liquid mixture comprising styrene (95 parts), methyl methacrylate (95 parts), n-butyl acrylate (126 parts), acrylic acid (40 parts), 2-hydroxyethyl acrylate (40 parts), the compound A obtained in Reference Example 1 (4 parts), azobisisobutyronitrile (6 parts) and laurylmercaptan (8 parts), dimethylaminoethanol (49.4 parts) as the neutralizing agent and deionized water (412 parts) for dilution to obtain a yellow aqueous resin solution. Content of non-volatile component, 32.9%. Viscosity, 180 cps (30° C.). $\overline{M}n$, 4,500. Tg, 23° C.

Reference Examples 15 to 22

The preparation of aqueous resin solution is effected by the solution polymerization, the neutralizing treatment and the dilution with water in the same manner as Table 3

| Reference Example No. | First reaction mixture | | | | Second reaction mixture | | | | | | |
|---|---|---|---|---|---|---|---|---|---|---|---|
| | A | B | 2HEA | Deionized Water | St | MMA | n-BA | 2HEA | AA | DMAE | LM |
| 5 | 12 | — | — | 120 | 104.4 | 104.4 | 139.2 | 40 | — | — | — |
| 6 | 8 | — | 8 | 120 | 103.2 | 103.2 | 137.6 | 32 | 8 | 9.9 | — |
| 7 | 12 | — | 16 | 120 | 104.4 | 104.4 | 139.2 | 24 | — | — | 8 |
| 8 | 12 | — | 8 | 120 | 104.4 | 104.4 | 139.2 | 32 | — | — | — |
| 9 | 16 | — | 8 | 120 | 100.8 | 100.8 | 134.4 | 32 | 8 | 9.9 | — |
| 10 | 12 | — | 16 | 120 | 104.4 | 104.4 | 139.2 | 24 | — | — | — |
| 11 | — | 8 | 8 | 120 | 104.4 | 104.4 | 139.2 | 24 | — | — | — |

| Reference Example No. | Solution of polymerization initiator | | | | Properties | | |
|---|---|---|---|---|---|---|---|
| | ACVA | AAPH | DMAE | Deionized water | Non-volatile component (%) | Viscosity (cps) (30° C) | Particle size of resin (μ) |
| 5 | 8 | — | 5.6 | 80 | 44.0 | 42 | 0.231 |
| 6 | 8 | — | 5.6 | 80 | 44.1 | 141 | 0.299 |
| 7 | 8 | — | 5.6 | 80 | 44.8 | 73 | 0.168 |
| 8 | 6 | — | 4.2 | 80 | 44.1 | 70 | 0.256 |
| 9 | 8 | — | 5.6 | 80 | 45.0 | 138 | 0.143 |
| 10 | — | 8 | — | 80 | 45.2 | 54 | 0.218 |
| 11 | 8 | — | 5.6 | 80 | 44.9 | 38 | 0.214 |

Note: ACVA — azobiscyanovaleric acid; AAPH — azobis-(2-amidinopropane) hydrochloride; Other abbreviations are the same as in Table 1.

Reference Example 13

In the same reaction apparatus as in Reference Example 4, ethylene glycol monoethyl ether (58 parts) is charged, and while stirring at 120° C., a liquid mixture comprising styrene (94 parts), methyl methacrylate (94 parts), n-butyl acrylate (124 parts), acrylic acid (40 parts), 2-hydroxyethyl acrylate (40 parts), the comin Reference Example 13 but using a liquid mixture having a varied composition (parts) as shown in Table 4, and dimethylaminoethanol as the neutralizing agent and deionized water for dilution each in a varied amount as shown in the same table to obtain various aqueous resin solution (Nos. 15 to 22), whose properties are shown in Table 4.

Table 4

| Run No. | A | B | St | MMA | n-BA | AA | 2HEA | AIBN | LM | DMAE | Deionized water | Non-volatile component (%) | Viscosity (cps) (30° C) | $\overline{Mn}$ | Tg (° C) |
|---|---|---|---|---|---|---|---|---|---|---|---|---|---|---|---|
| 14 | 4 | — | 95 | 95 | 126 | 40 | 40 | 6 | 8 | 34.7 | 722 | 33.9 | 130000 | 6000 | 23 |
| 15 | 4 | — | 95 | 95 | 126 | 40 | 40 | 6 | 8 | 49.6 | 707 | 34.2 | 865000 | 6000 | 23 |
| 16 | 4 | — | 89 | 89 | 118 | 60 | 40 | 6 | — | 52 | 705 | 35.5 | 260000 | 27000 | 26 |
| 17 | 8 | — | 100 | 100 | 132 | 20 | 40 | 6 | 8 | 24.8 | 732 | 33.5 | 1250000 | 5550 | 20 |
| 18 | 8 | — | 88 | 88 | 116 | 60 | 40 | 6 | 12 | 56 | 701 | 34.0 | 80000 | 2500 | 27 |
| 19 | — | 8 | 94 | 94 | 124 | 40 | 40 | 6 | 8 | 34.7 | 722 | 33.6 | 70000 | 5000 | 22 |
| 20 | 16 | — | 91 | 81 | 122 | 40 | 40 | 6 | 8 | 34.7 | 722 | 33.3 | 110000 | 6000 | 25 |
| 21 | 16 | — | 85 | 85 | 114 | 60 | 40 | 6 | 8 | 37.2 | 720 | 34.1 | 215000 | 5500 | 28 |

Note: The abbreviations are the same as in Table 1.

EXAMPLE 19

The aqueous resin solution obtained in Reference Example 18 (60 parts) is admixed with a white pigment ("Titon R-5N"; rutile type titanium oxide manufactured by Sakai Chemical Industry Co., Ltd.) (200 parts), ethylene glycol monobutyl ether (20 parts) and deionized water (46 parts), and the mixture is dispersed well by the aid of a SG mill for 15 minutes to obtain a white paste of paint.

To the thus obtained white paste of paint (31.6 parts), the resin emulsion obtained in Reference Example 4, 6 or 8 (50 parts), a liquid melamine resin ("Sumimal M-50W", manufactured by Sumitomo Chemical Company, Limited) (10 parts) and ethylene glycol monobutyl ether (10 parts) are added, and mixed well under stirring to prepare a white thermosetting paint composition.

The above obtained paint composition is applied to a steel plate previously subjected to a surface treatment to make a dry film thickness of about 40μ and then baked at 140° C. for 20 minutes for drying. The properties of the hardened coating film thus obtained are shown in Table 5.

EXAMPLE 20

The procedure as in Example 19 is repeated but using the aqueous resin solution obtained in Reference Example 16 to obtain a white paste for paint.

To the thus obtained white paste for paint (31.6 parts), the resin emulsion obtained in Reference Example 4, 6 or 8 (42.5 parts), the aqueous resion solution obtained in Reference Example 15 (10 parts), the same liquid melamine resin as in Example 19 ("Sumimal M-50W") (10 parts) and ethylene glycol monobutyl ether (10 parts) are added and admixed well under stirring to prepare a white thermosetting paint composition.

Using the thus obtained paint composition, a hardened coating film is formed in the same manner as in Example 19. The properties of the obtained coating film are shown in Table 6.

Table 6

| Resin emulsion | Reference Example No. | | |
|---|---|---|---|
| Properties | 4 | 6 | 8 |
| Surface of coating film | Smooth and good | Smooth and good | Smooth and good |
| Luster (determined by a glossmeter with an angle of 60°) | 93 | 88 | 92 |
| Pencil hardness | H | H | H |
| Erichsen value (mm) | 6.9 | 5.9 | 6.7 |
| Impact strength (DuPont method, ½ kg, ½ inch) (cm) | 40 | 30 | 40 |
| Water resistance (boiling water, 1 hour) | Normal | Normal | Normal |
| Gasoline resistance (after immersion into commercially available gasoline for 20 minutes) | Normal | Normal | Normal |

Comparative Example 2

Preparation of resin emulsion

A resin emulsion is prepared in the same manner as in Reference Example 4 but using a mixture comprising acrylic acid (20 parts), 2-hydroxyethyl acrylate (8 parts), dimethylethanolamine (24.7 parts) and deionized water (120 parts) as the first liquid mixture and a mixture comprising styrene (104 parts), methyl methacrylate (104 parts), n-butyl acrylate (136 parts) and 2-

Table 5

| Resin emulsion | Reference Example No. | | |
|---|---|---|---|
| Properties | 4 | 6 | 8 |
| Surface of coating film | Smooth and good | Smooth and good | Smooth and good |
| Luster (determined by a glossmeter with an angle of 60°) | 84 | 80 | 83 |
| Pencil hardness | F | H | H |
| Erichsen value (mm) | 6.5 | 6.5 | 6.1 |
| Impact strength (DuPont method, ½ kg, ½ inch) (cm) | 50 | 35 | 40 |
| Water resistance (boiling water, 1 hour) | Normal | Normal | Normal |
| Gasoline resistance (after immersion into commercially available gasoline for 20 minutes) | Normal | Normal | Normal | hydroxyethyl acrylate (32 parts) as the second liquid mixture.

Preparation of aqueous resin solution

A aqueous resin solution is prepared by the solution polymerization, the neutralization treatment and the dilution with water in the same manner as in Reference Example 13 but using a liquid mixture comprising styrene (96 parts), methyl methacrylate (96 parts), n-butyl acrylate (128 parts), acrylic acid (40 parts), 2-hydroxyethyl acrylate (40 parts), azobisisobutyronitrile (6 parts) and laurylmercaptan (8 parts), dimethylaminoethanol (49.6 parts) as the neutralizing agent and deionized water (707 parts) for dilution.

Preparation of paint composition

A white paste of paint is prepared in the same manner as in Example 19 but using the above obtained aqueous resin solution and adopting a dispersion time of 30 minutes.

Using the thus obtained white paste of paint and the resin emulsion, preparation of a white thermosetting paint composition is effected in the same manner as in Example 19, whereby the paint composition still contains foams produced at the mixing step even after allowed to stand for 24 hours. Using this paint composition, a hardened coating film is formed in the same manner as in Example 19. When the thus obtained coating film is immersed into boiling water for 1 hour, generation of blisters and delustering are observed. When the coating film is immersed into commercially available gasoline for 20 minutes, it peels off from the substrate.

Reference Example 12

In the same reaction vessel as in Reference Example 3, deionized water (288 parts) is charged, and while stirring at 90° C., a solution of polymerization initiator comprising azobiscyanovaleric acid (8 parts), dimethylethanolamine (5.6 parts) and deionized water (80 parts) is added thereto in a ¼ amount. Then, a mixture comprising an ampho-ionic monomer (N-methacryloyloxy-N,N-dimethyl-N,3-propylsulfobetaine) (8 parts), 2-hydroxyethyl acrylate (8 parts) and deionized water (120 parts) as the first liquid mixture, a mixture comprising styrene (105.6 parts) and methyl methacrylate (32 parts) as the second liquid mixture and the rest of the above mentioned solution of polymerization initiator are dropwise added, separately and simultaneously, at the same temperature in 20 minutes. After the addition, stirring is continued for further 40 minutes for aging to obtain a thermosetting resin emulsion containing 44.7% of non-volatile component. Viscosity, 103 cps (30° C.). Particle size of resin, 0.283μ.

Reference Example 23

In the same reaction vessel as in Reference Example 3, ethyl cellosolve (58 parts) is charged, and while stirring at 120° C., a liquid mixture comprising styrene (95 parts), methyl methacrylate (95 parts), n-butyl acrylate (126 parts), acrylic acid (40 parts), 2-hydroxyethyl acrylate (40 parts), the same ampho-ionic monomer as in Reference Example 12 (4 parts), azobisisobutyronitrile (6 parts) and dodecylmercaptan (8 parts) is dropwise added thereto in 2 hours. Then, a solution comprising azobisisobutyronitrile (2 parts) and ethyl methyl ketone (12 parts) is dropwise added in 30 minutes, and stirring is continued for further 1 hour for aging. The resultant viscous polymeric product is neutralized with dimethylethanolamine (49.6 parts) and diluted with deionized water (707 parts) to obtain a pale yellow aqueous solution of resin containing 34.2% of non-volatile component.

Reference Example 24

The procedure comprising the solution polymerization, the neutralizing treatment and the dilution with water as in Reference Example 23 is repeated but varying the amount of the ampho-ionic monomer to obtain aqueous resin solutions containing the ampho-ionic monomer in a proportion of 0%, 1% and 2% to the total amount of the monomers (Nos. 1 to 3). To each of these aqueous resin solutions, water and butyl cellosolve are added so as to prepare a solution for pigment dispersion containing 17% of non-volatile component, 68% of water, 12% of butyl cellosolve and 3% of ethyl cellosolve.

The thus obtained solution for pigment dispersion (150 parts) is added to rutile type titanium oxide ("Titon R-5N") (200 parts) and dispersed well by the aid of a SG mill using glass beads for 30 minutes. The particle size of the dispersed substance ($\mu$) dependent on the dispersion time is shown in Table 7.

Table 7

| Aqueous resin solution No. Dispersion time (minutes) | 1 (0%) | 2 (1%) | 3 (2%) |
|---|---|---|---|
| 5 | 50 μ | 30 μ | 30 μ |
| 10 | 30 | 20 | 20 |
| 15 | 15 | less than 10 | less than 10 |
| 20 | 10 | " | " |
| 30 | less than 10 | " | " |

Each of the white pastes of paint obtained by the above dispersing treatment (35 parts) is admixed with the respective aqueous resin solution used (16 parts) and the liquid melamine resin ("Sumimal M-50W") (4.8 parts) to prepare a thermosetting paint composition, which is diluted with a mixture of water and butylcellosolve (weight ratio, 80:20) such that its viscosity becomes 30 seconds/No. 4 Ford cup (20° C.) to obtain a system having a content of nonvolatile component as shown in Table 8. The thus obtained system is applied to a substrate by a procedure shown in Table 8 and baked at 140° C. for 30 minutes. The surface appearance of the obtained coating film is shown in Table 8.

Table 8

| | Aqueous resin solution No. | 1 (0%) | 2 (1%) | 3 (2%) |
|---|---|---|---|---|
| Non-volatile component (%) | | 33.0 | 35.5 | 36.0 |
| Appearance of coating film | Doctor blade-coating on glass plate with 3 mil | Pin holes due to foams | Smooth and good | Smooth and good |
| | Flow coating on tin plate | Craters on whole surface | Craters only at traces of hanging | Craters only at traces of hanging |

Table 8-continued

| Aqueous resin solution No. | 1 (0%) | 2 (1%) | 3 (2%) |
|---|---|---|---|
| Non-volatile component (%) | 33.0 | 35.5 | 36.0 |
| Air spray coating on polished soft steel plate | Dents | down Smooth and good | down Smooth and good |

EXAMPLE 21

A white paste of paint is prepared as in Reference Example 24 but using a commercially available aqueous solution of acryl resin ("MARD-3031" manufactured by Nippon Paint Co., Ltd., content of non-volatile component, 65%) as the aqueous resin solution in the solution for dispersion of pigment.

To the thus obtained white paste of paint (35 parts), the aqueous resin solution of Reference Example 23 (3.8 parts), the commercially available aqueous solution of acryl resin mentioned above (14.4 parts) and the liquid melamine resin ("Sumimal M-50B") (4.8 parts) are added, and a surface-regulating agent ("Lebeler W" manufactured by Nippon Paint Co., Ltd.) is incorporated therein in a proportion of 1% to prepare a thermosetting paint composition.

For comparision, another thermosetting paint composition is prepared by the same procedure as above but using the commercially available aqueous solution of acryl resin (3.8 parts) in place of the said aqueous resion solution of Reference Example 23 (3.8 parts). (This composition corresponds to a conventional water soluble resin paint.)

Figure 1:
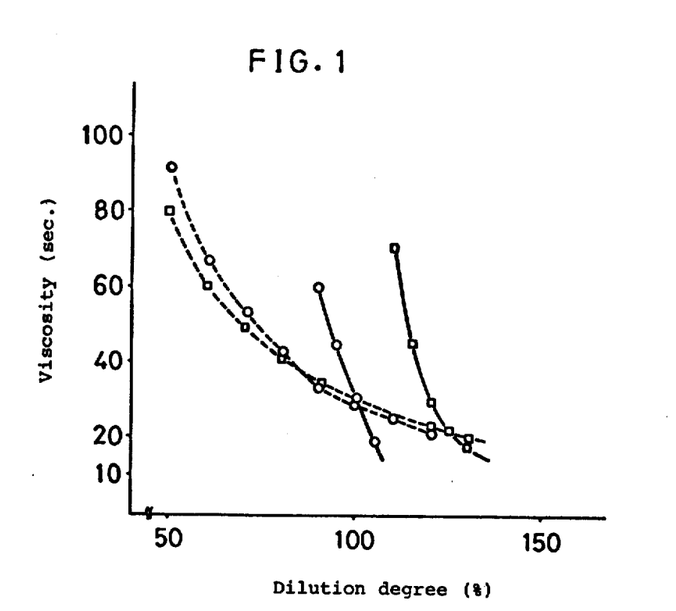

When each of the two paint compositions thus obtained (the composition of invention and the composition for comparison) is diluted with water or a mixture of water and butylcellosolve (weight ratio, 80:20), there exists a relationship as shown in FIG. 1 of the attached drawings between the dilution degree (%) and the viscosity (seconds/No. 4 Ford cup (20° C.)).

—○— = the composition of invention diluted with water;

—□— = the composition for comparison diluted with water;

--O-- = the composition of invention diluted with a mixture of water and butylcellosolve;

--□-- = the composition for comparison diluted with a mixture of water and butylcellosolve).

Figure 2:
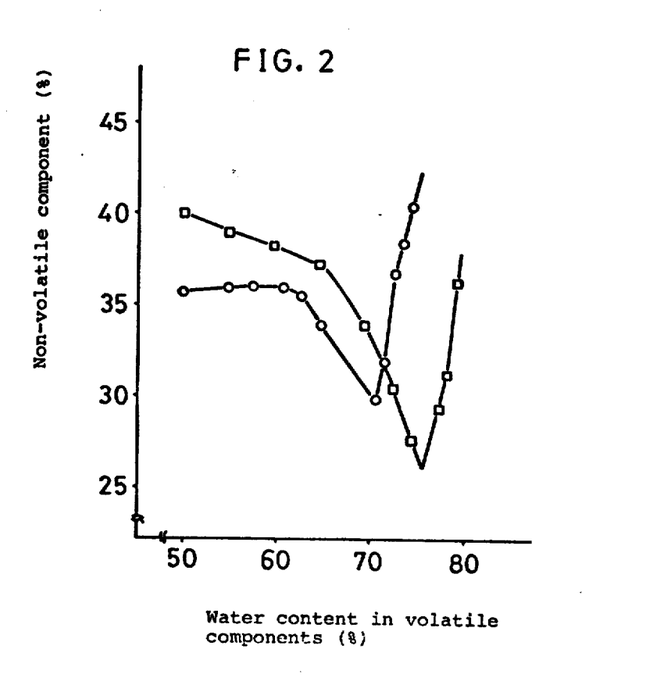

The, the viscosity is regulated to 40 seconds/No. 4 Ford cup (20° C.) by dilution with a mixture of water and butylcellosolve while controlling the ratio of water to the organic solvent in the volatile component. The change of the content of non-volatile component (%) to the content of water in the volatile component is as shown in FIG. 2 of the attached drawing.

( —○— = the composition of invention;
—□— = the composition for comparison)

Finally, each of the two paint composition is diluted with water or a mixture of water and butylcellosolve (weight ratio, 80:20) so as to obtain a viscosity of 40 seconds/No. 4 Ford cup (20° C.). The dilution is applied to a polished soft steel plate by cold air spray coating, and after allowed to stand at room temperature (27° C.) for 15 minutes, baked at 150° C. for 20 minutes for drying. The film thickness limit at flowing out and the film thickness limit at hanging down are shown in Table 9. Separately, a hardened coating film having a dry film thickness of 35 is formed on a plate treated with zinc phosphate in the same manner as above. The properties of the thus obtained film are shown in Table 9.

Table 9

| Pro-perties | Diluting agent | Compositon of invention | | Composition for comparison | | Remarks |
|---|---|---|---|---|---|---|
| | | Water | Mixture | Water | Mixture | |
| Film thickness limit at flowing out (μ) | | 50 | 52 | 40 | 48 | Conditons in booth: temp., 27° C; humidity, 66° % |
| Film thickness limit at hanging down (μ) | | 40 | 27 | 35 | 33 | |
| Surface of coating film | | Smooth and good | | Smooth and good | | |
| Luster | | 94 | | 94 | | 60° gloss |
| Pencil hardness | | 2H | | 2H | | |
| Impact strength (cm) | | 30 | | 20 | | DuPont method, ½ inch × 500 g |
| Erichsen value (mm) | | 3 | | 3.5 | | |
| Water resistance | | Normal | | Normal | | immerson at 40° C for 48 hrs |
| Gasoline resistance | | Good | | Good | | immersion at room temperature for 8 hrs |

Examples 22 to 26

Powdery aluminum ("Alpaste 1123-N" manufactured by Toyo Aluminum K.K.) (5.6 parts) is dissolved in butylcellosolve (5.6 parts), and a commercially available aqueous solution of acryl resin ("AWS-1005" manufactured by Nippon Paint Co., Ltd.) (11.4 parts) is added thereto. The mixture is dispersed well under stirring by the aid of a monomixer to prepare and silver paste of paint.

To the thus obtained paste of silver paint (47 parts), a mixture of the resin emulsion of Reference Example 12 and a commercially available resin emulsion ("AWD-5367" manufactured by Nippon Paint Co., Ltd.) in a mixing ration (%, resin component) as shown in Table 10 (19.2 parts) and a liquid melamine resin ("Saymer 303" manufactured by A.C.C.) (7.7 parts) are added and admixed well to prepare silver metallic thermosetting paint compositions (Nos. 22 to 26).

Each of the thus obtained paint compositions (Nos. 22 to 26) is applied to a plate treated with zinc phosphate by air spray coating to make a dry film thickness of 25 to 30μ. After the plate is allowed to stand at room temperature for 2 minutes, a clear paint mainly comprising a usual water-soluble acryl resin is further applied to the coated surface by the so-called wet on wet coating to make a dry film thickness of 20 to 25μ and, after allowed to stand at room temperature for 15 minutes, baked at 150° C. for 20 minutes for drying to obtain a hardened coating film of silver metallic color. The properties of the thus obtained coating film are shown in Table 10.

mine resin "Sumimal M-50W") having a solid content previously regulated to 50% with butylcellosolve is added thereto in a proportion of 20 parts to 40 parts of the total resin components in the said mixture. Then, a surface-regulating agent ("Lebeler-W") is added in a proportion of 1% to prepare a clear thermosetting paint composition.

To a plate treated with zinc phosphate, a silver metallic paint mainly comprising a usual acryl resin dispersible in water into a colloidal form is applied by air spray coating to make a dry film thickness of 25 to 30μ, and Table 10

| Paint Composition No. | | 22 | 23 | 24 | 25 | 26 | Remarks |
|---|---|---|---|---|---|---|---|
| Mixing proportion of resin emulsions (%) | Resin emulsion of Reference Example 12 | 10 | 25 | 50 | 75 | 90 | |
| | Commercially available resin emulsion | 90 | 75 | 50 | 25 | 10 | |
| Non-volatile component at coating (%) | | 31.8 | 32.1 | 32.5 | 33.0 | 34.5 | 30 seconds/No. 4 Ford cup (20° C) |
| Workability of metallic paint | | Good | Good | Good | Good | Good | Metallic coating |
| Appearance of coating | | Good | Good | Good | Good | Uneven-of tone | |
| Luster | | 98 | 98 | 98 | 97 | 98 | 60° gloss |
| Pencil hardness | | H | H | H | H | H | |
| Water resistance | Swelling | Normal | Normal | Normal | Normal | Normal | Immersion at 50° C for 24 hours |
| | Secondary close adhesion | O | O | O | O | X | |
| Salt spraying property (mm) | | 10 | 3.5 | 4 | 4 | 10 | 48 hours, width of peeling off at one side |
| Gasoline resistance | | 2B | 2B | 2B | 2B | 2B | Pencil hardness after immersion for 8 hours |

Examples 27 to 31 and Comparative Examples 3 and 4

The aqueous resin solution of Reference Example 23, the resin emulsion of Reference Example 12, a commercially available aqueous solution of acryl resin ("AWS-1005") and a commercially available resin emulsion ("AWD-5380") are mixed in a proportion ((%), resin component) as shown in Table 11, and a liquid melathe said clear thermosetting paint composition is further applied thereto by air spray coating to make a film thickness of 20 to 25μ. The plate is allowed to stand at room temperature for 15 minutes and then baked at 120° C., 150° C. or 180° C. for 20 minutes to obtain a hardened coating film. The properties of the thus obtained coating film dependent on the baking temperature are shown in Table 11.

Table 11

| Paint composition | | | Example No. | | | | Comparative Example No. | |
|---|---|---|---|---|---|---|---|---|
| | | | 27 | 28 | 29 | 30 | 31 | 3 | 4 |
| Mixing proportion of liquid resin (%) | Aqueous resin solution of Reference Example 32 | | 25.2 | 50 | 76.7 | 95 | — | — | — |
| | Resin emulsion of Reference Example 12 | | — | — | — | — | 23 | — | — |
| | Commercially available aqueous resin solution | | 56.8 | 38 | 17.6 | — | 77 | 77 | — |
| | Commercially available resin emulsion | | 18.0 | 12 | 5.7 | 5 | — | 23 | 100 |
| Non-volatile component at coating (%) (35 seconds/No. 4 Ford cup (20° C)) | | | 43.2 | 43.2 | 43.2 | 43.5 | 40.0 | 43.0 | 27.0 |
| Appearance of coating | | 120° C | Good | Good | Good | Somewhat rough surface | Good | Dents | Good |
| | | 150° C | " | " | " | " | " | " | " |
| | | 180° C | " | " | " | " | " | " | " |
| Luster (60° gloss) | | 120° C | 95 | 93 | 92 | 93 | 95 | 94 | 90 |
| | | 150° C | 93 | 92 | 92 | 90 | 97 | 95 | 83 |
| | | 180° C | 91 | 93 | 93 | 93 | 95 | 90 | 85 |
| Pencil hardness | | 120° C | HB | F | H | H | F | HB | F |
| | | 150° C | H | H | H | H | F | H | H |
| | | 180° C | 2H | 2H | 2H | 2H | 2H | 2H | 2H |
| Water resistance (immersion at 50° C for 24 hours) | | 120° C | X | Δ | Δ | Δ | X | X | X |
| | | 150° C | X | O | O | O | Δ | X | O |
| | | 180° C | O | O | O | O | O | X | O |
| Gasoline resistance (pencil hardness after | | 120° C | less than | 6B | 4B | 4B | 4B | less than | 4B |

Table II-continued

| Paint composition | | Example No. 27 | 28 | 29 | 30 | 31 | Comparative Example No. 3 | 4 |
|---|---|---|---|---|---|---|---|---|
| immersion for 8 hours) | | 6B | | | | | 6B | |
| | 150° C | 2B | 2B | B | B | B | 3B | HB |
| | 180° C | HB | HB | F | F | F | 2B | F |

What is claimed is:

1. An aqueous solution or dispersion of thermosetting resin comprising a resin, dissolved or dispersed in water in an amount of 5 to 85% by weight, said resin being obtained by solution polymerization of a mixture comprising (1) at least one polymerizable monomer having an amphoteric ion structure selected from the group consisting of (i) compounds represented by the formula:

[I]

wherein $R_1$ is a hydrogen atom or a methyl group, $R_2$ and $R_3$ are, the same or different, a $C_1$-$C_6$ alkyl group, A is O or NH, $m_1$ and $n_1$ are, the same or different, an integer of 1 to 12 and $X_1^{\ominus}$ is $SO_3^{\ominus}$, $SO_4^{\ominus}$ or $CO_2^{\ominus}$ and (ii) compounds represented by either one of the formulae:

[II]

and

[III]

wherein $R_4$ is a hydrogen atom or a methyl group, $R_5$ is a hydrogen atom or a $C_1$-$C_3$ alkyl group, A' is O or NH, $m_2$ is an integer of 0 to 6, $n_2$ is an integer of 1 to 6 and $X_2^{\ominus}$ are as defined above, (2) at least one polymerizable monomer containing a carboxyl group and (3) at least one of other polymerizable monomers in a hydrophilic organic solvent and has a number average molecular weight of 1,000 to 30,000 and a glass transition point of $-30°$ to $+80°$ C.

2. The aqueous solution or dispersion of thermosetting resin according to claim 1, wherein the said other polymerizable monomers comprise hydroxyl group-containing polymerizable monomers, acrylates or methacrylates having a $C_1$-$C_{12}$ alcoholic residue, polymerizable amides, polymerizable nitriles, polymerizable aromatic compounds, α-olefin compounds, vinyl compounds and diene compounds.

3. The aqueous solution or dispersion of thermosetting resin according to claim 1, wherein the mixing proportion of the polymerizable monomer having an amphoteric ion structure, the carboxyl group-containing polymerizable monomer and the other polymerizable monomer is 0.1-50:2-60:1-97.9 by weight.

4. The aqueous solution or dispersion of thermosetting resin according to claim 1, wherein the mixing proportion of the polymerizable monomer having an amphoteric ion structure, the carboxyl group-containing polymerizable monomer and the other polymerizable monomer is 0.5-10:2-60:30-97.5 by weight.

5. A thermosetting paint composition which comprises an aqueous solution or dispersion of thermosetting resin according to claim 1, and an aminoplast resin.

6. The thermosetting paint composition according to claim 5, wherein the aminoplast resin is a melamine resin, an urea resin or a guanamine resin or their mixture.

7. The composition according to claim 5, wherein the mixing proportion of the resin in the aqueous solution or dispersion of thermosetting resin and the aminoplast resin is from 20:1 to 1:1 by weight.

8. A thermosetting paint composition which comprises (a) a resin emulsion obtained by polymerizing a polymerizable monomer having an amphoteric ion structure and at least one of other polymerizable monomers copolymerizable therewith, (b) an aqueous solution or dispersion of resin obtained by polymerizing a polymerizable monomer having an amphoteric ion structure and a carboxyl group-containing polymerizable monomer with or without at least one of other polymerizable monomers copolymerizable therewith and (c) an aminoplast resin.

9. The thermosetting paint composition according to claim 8, wherein the mixing proportion of the resin in the resin emulsion and the resin in the aqueous solution or dispersion of resin is from 50:50 to 99:1 by weight.

10. The thermosetting paint composition according to claim 8, wherein the amount of the aminoplast resin is 5 to 100 parts by weight to 100 parts by weight of the total amount of the resin in the resin emulsion and the resin in the aqueous solution or dispersion of resin.

11. A thermosetting paint composition which comprises (a) at least one conventional aqueous solution or dispersion of resin employed for paints and/or at least one conventional resin emulsion employed for paints, (b) an aqueous solution or dispersion of resin having an amphoteric ion structure and/or an emulsion of resin having an amphoteric ion structure and (c) an aminoplast resin.

12. The thermosetting paint composition according to claim 11, wherein the aqueous solution or dispersion of resin having an amphoteric ion structure is the one obtained by solution polymerization of a polymerizable monomer having an amphoteric ion structure and a carboxyl group-containing polymerizable monomer copolymerizable therewith, optionally followed by neutralization and dilution with water.

13. The thermosetting paint composition according to claim 11, wherein the emulsion of resin having an amphoteric ion structure is the one obtained by polymerizing a polymerizable monomer having an amphoteric ion structure and at least one of other polymerizable monomers copolymerizable therewith in water.

14. The thermosetting paint composition according to claim 11, wherein the aminoplast resin is a melamine resin, a urea resin or a guanamine resin or their mixture.

15. The thermosetting paint composition according to claim 11, wherein the mixing proportion of the components (a) and (b) is from 10:90 to 95:5 by weight as resin component.

16. The thermosetting resin composition according to claim 11, wherein the amount of the component (c) is 5–50% by weight as resin component to the total amount of the resins in the components (a) to (c).

* * * * *